US006470488B1

(12) United States Patent
Kao

(10) Patent No.: US 6,470,488 B1
(45) Date of Patent: Oct. 22, 2002

(54) METHOD FOR MANUFACTURING A MASK

(75) Inventor: Ming-Cheng Kao, Hsinchuang (TW)

(73) Assignee: United Microelectronics Corp., Hsin-Chu (TW)

( * ) Notice: Subject to any disclaimer, the term of this patent is extended or adjusted under 35 U.S.C. 154(b) by 289 days.

(21) Appl. No.: 09/639,830

(22) Filed: Aug. 17, 2000

(51) Int. Cl.[7] .............................................. G06K 17/50
(52) U.S. Cl. ....................................................... 716/19
(58) Field of Search .......................... 716/1, 8, 11, 19, 716/21; 430/302, 313

(56) References Cited

U.S. PATENT DOCUMENTS

| 4,952,522 A | * | 8/1990 | Yamada et al. ................. 430/5 |
| 5,450,332 A | * | 9/1995 | Criscuoli et al. .............. 716/21 |
| 5,893,740 A | * | 4/1999 | Chang et al. ................ 438/289 |
| 6,055,367 A | * | 4/2000 | Liebmann et al. ............. 716/19 |
| 6,226,781 B1 | * | 5/2001 | Nistler et al. ................. 716/19 |

OTHER PUBLICATIONS

Zhiping Yu Wang, K. et al., "Layout–based 3D solid modeling of IC", May/1995, IEEE pp. 108–112.*

* cited by examiner

*Primary Examiner*—John F. Niebling
*Assistant Examiner*—Stacy Whitmore
(74) *Attorney, Agent, or Firm*—Winston Hsu

(57) ABSTRACT

The present invention provides a method of manufacturing an mask. An integrated circuit layout data base is first provided, which includes $N^+$ ion implantation layout data, $P^+$ ion implantation layout data, defined polysilicon layout data, N well layout data and salicide block (SAB) layout data. A logical operation is performed using the integrated circuit layout data provided to obtain new layout pattern data, which includes the layout data of the $N^+$ polysilicon resist devices within the N well region and the layout data of $P^+$ polysilicon resist devices within P well region and the N well layout data. Finally, the new layout pattern data is used to form an implantation mask.

19 Claims, 3 Drawing Sheets

METHOD FOR MANUFACTURING A MASK

BACKGROUND OF THE INVENTION

1. Field of the Invention

The present invention provides a method for making a mask, and more particularly, to a method of manufacturing a x 2.5 $N^+$ polysilicon implantation mask, in which the x 2.5 $N^+$ polysilicon implantation mask is made with a layout pattern generated by a logical operation.

2. Description of the Prior Art

Photolithography technology plays a critical role in processing of semiconductor wafers. Depending on the level of complexity in a circuit design, five to twenty photolithographic operations are required for each wafer. In a photolithographic process, the most important consideration is the design of the N polysilicon implantation mask. Since the circuit on a wafer is created with an $N^+$ polysilicon implantation mask through a step-and-repeat exposure process, the selection and quality of the $N^+$ polysilicon implantation will affect production yield and throughput.

Recently, to design and manufacture $N^+$ polysilicon implantation masks, manufacturers would obtain a circuit layout data base provided by a client (normally an IC design house), including ion implantation layout data, N well layout data or salicide block (SAB) layout data, etc, and generate, with a computer aided designing (CAD) system, layout data meeting the design rules for wafer production.

According to the prior art, an $N^+$ ion implantation process is performed by transferring the pattern of an $N^+$ implantation mask onto the photoresist layer of a polysilicon layer. However, due to limitations in the photolithographic operation, x 2.5 N well ion implantation masks are ruled out for transferring layout patterns, as the line width is less than 0.25 micron. Instead, x 5 N well masks, which have a better resolution, are used. Due to this limitation, wafer production yield is limited.

To solve this problem, a x 2.5 P well mask is generally used for transferring the N ion implantation layout pattern onto a polysilicon layer. But when using x 2.5 P well mask for transferring the layout pattern, the following design rules must first be met: (1) $N^+$ polysilicon resist devices must be placed within P well regions; and (2) $P^+$ polysilicon resist devices must be placed within N well regions. Unfortunately, under some circumstances, the original layout data provided by a client might not comply with the two design rules; for this reason, a method has to be developed to accommodate these circumstances.

SUMMARY OF THE INVENTION

It is therefor a primary objective of this invention to provide a new method for manufacturing an implantation mask to correct the weaknesses described above.

The second objective of the invention is to provide a method for manufacturing x 2.5 $N^+$ polysilicon implantation mask to improve the wafer production yield.

The third objective of the invention is to provide a method for manufacturing x 2.5 $N^+$ polysilicon implantation mask which simultaneously determines the data of the $N^+$ polysilicon implantation layout, the layout data of $N^+$ polysilicon resist devices within $N^+$ well regions, and the layout data of $P^+$ polysilicon resist devices within P well regions.

Another objective of the invention is to provide a logical operation for making x 2.5 $N^+$ polysilicon implantation mask.

In the present invention, an integrated circuit layout data base is first provided, which comprises $N^+$ ion implantation layout data, $P^+$ ion implantation layout data, defined polysilicon layout data, N well layout data, and SAB layout data. A logical operation is performed on this data base, the result of which includes the layout data of $N^+$ polysilicon resist devices within the N well region, the layout data of the $P^+$ polysilicon resist devices within the P well region, and the N well layout data, and which is used to make an $N^+$ polysilicon implantation mask.

In the preferred embodiment according to this invention, the $N^+$ polysilicon implantation mask is used to transfer the layout pattern onto a photoresist layer located on a polysilicon layer.

This invention utilizes the $N^+$ implantation layout data to be processed on a polysilicon layer, the layout data of $N^+$ polysilicon resist devices within N well region, and the layout data of $P^+$ polysilicon resist devices within the N well region. Because of the application of the logical operation performed on the integrated circuit layout data in generating a new layout pattern, not only is the high production yield of a x 2.5 $N^+$ implantation mask retained, but furthermore some original client circuit layout data, which does not comply with the design rules and was previously unusable, can be now be used.

These and other objectives of the present invention will no doubt become obvious to those of ordinary skill in the art after reading the following detailed description of the preferred embodiment, which is illustrated in the various figures and drawings.

DETAILED DESCRIPTION OF THE PRESENT INVENTION

Figure 1:
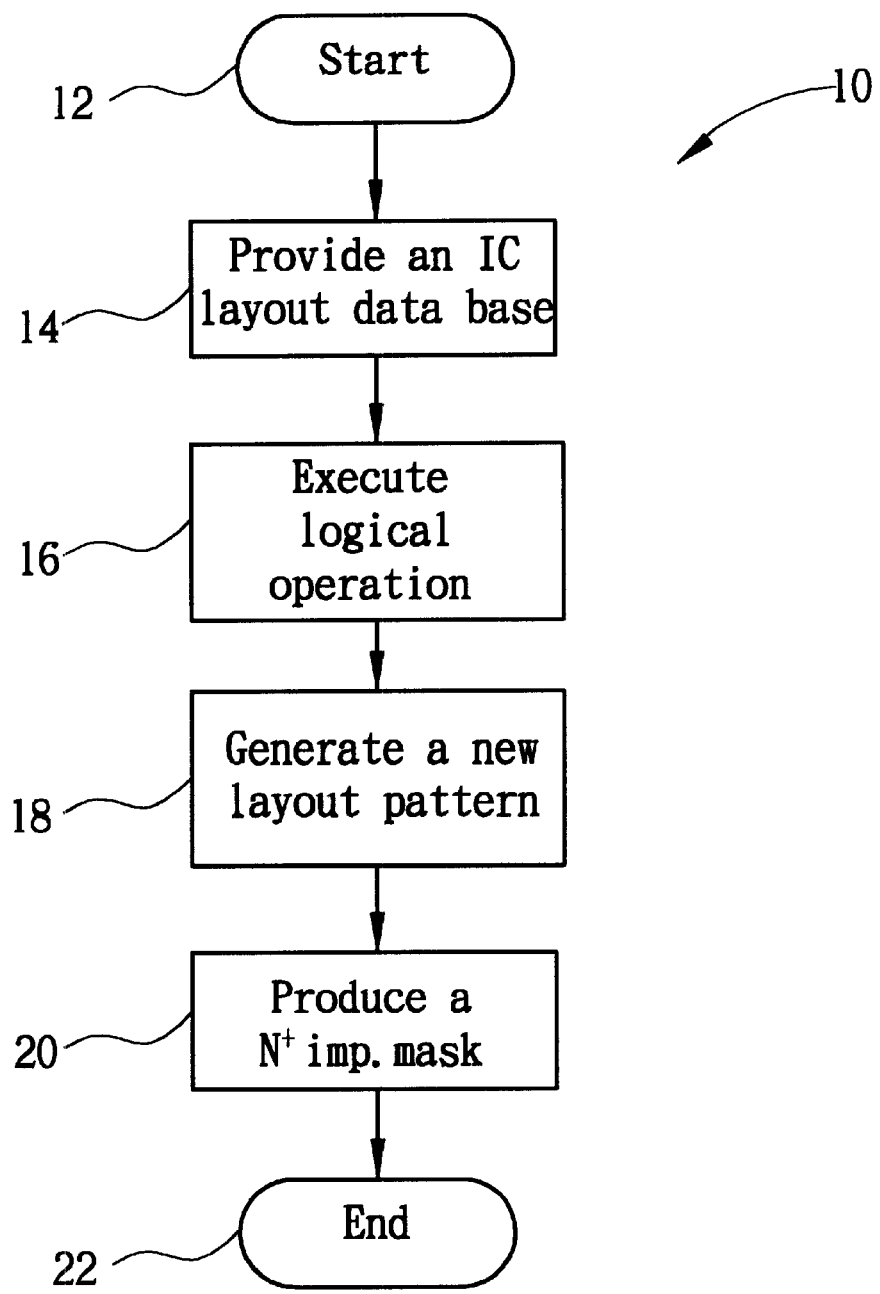
FIG. 1 is a flow chart of the processes of manufacturing an $N^+$ polysilicon implantation mask according to the present invention.

Please refer to FIG. 1. FIG. 1 is a flow chart 10 of the manufacturing processes for an $N^+$ polysilicon implantation mask according to the present invention. As stated above, when a client, such as an IC design house, provides an integrated circuit layout database, a layout rule review checking process is performed on the layout data to ensure that the data complies with the design rules. The present method is intended for data that doesn't comply with the design rules. In other words, the flow chart 10 is used to deal with databases that don't meet the design rules for making $N^+$ polysilicon implantation masks.

As shown in FIG. 1, if a circuit layout data base provided by a client strays from the design rules, i.e., when the circuit layout data base has one of the following problems: (1) $N^+$ polysilicon resist devices are located in N well regions; or (2) $P^+$ polysilicon resist devices are located within P well regions , then the manufacturer should proceed to the flow chart 10, starting with step 14. In step 14 an integrated circuit layout data base is provided, which could be either the original data base provided by the client or a partial data base made from the original data base, and which must include $N^+$ ion implantation layout data, $P^+$ ion implantation layout data, defined polysilicon layout data, N well layout data and SAB layout data.

Next, the manufacturer enters these data into a computer aided designing (CAD) system, and uses these data to execute a logical operation (step 16) to generate new layout pattern data, which includes $N^+$ ion implantation layout data to be processed on a target polysilicon layer, a layout pattern of the $N^+$ polysilicon resist devices within the N well regions, and a layout pattern of the $P^+$ polysilicon resist devices within the P well region. With the result of the logical operation in step 16, a new layout pattern is generated (step 18). Finally, the manufacturer generates an $N^+$ polysilicon implantation mask from the new layout pattern in step 20 to complete the process of making the $N^+$ polysilicon implantation mask (step 22).

Figure 2:
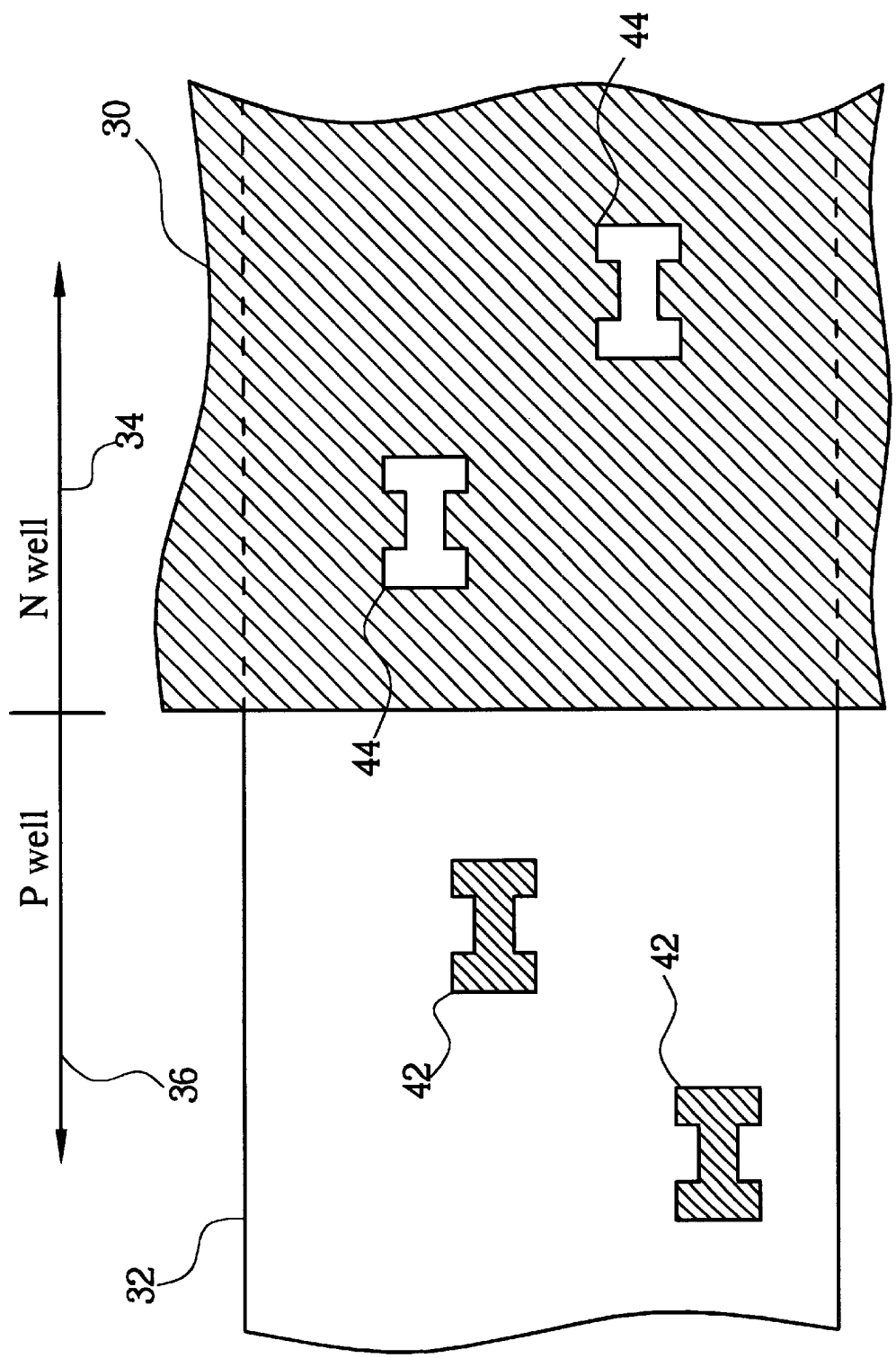
FIG. 2 is a partial view of a new photoresist layout pattern generated by a logical operation according to the present invention.

Please refer to FIG. 2. FIG. 2 is an enlarged partial view of a new photoresist layout pattern 30 generated by the logical operation according to the present invention. The layout pattern, made of a positive photoresist, such as an implantation mask used for performing a phosphorous ion implantation process, is used for performing an $N^+$ ion implantation on an underlying polysilicon layer 32. As shown in FIG. 2, the polysilicon layer 32 is divided into two regions: an N well region 34 and a P well region 36, in an N ion implantation process.

Since the polysilicon layer 32 within the P well region 36 needs an $N^+$ ion implantation, the polysilicon layer 32 within the P well region 36 is not covered by any resist, except in regions 42, in which are located $P^+$ polysilicon resist devices. In contrast, since the N well region 34 does not require an $N^+$ ion implantation, the polysilicon layer 32 is covered with resist, except regions 44, in which are located $N^+$ polysilicon resist devices. In FIG. 2, the resist layout pattern 30 is generated by a x 2.5 $N^+$ polysilicon implantation mask made with the method in this invention.

In the preferred embodiment, an integrated circuit layout pattern database must first be provided, which includes $N^+$ ion implantation layout data, $P^+$ ion implantation layout data, a defined polysilicon layout pattern, an N well layout pattern and an SAB layout pattern. These data are saved in a computer aided designing (CAD) system, and the manufacturer uses the CAD system to read these data from a layout pattern data base, and to display these data on a cathode ray tube (CRT), and then to execute the following logical operation steps to obtain a new layout pattern:

(1) Generating A, where A=$N^+$ implanted defined polysilicon layout data.

(2) Generating B, where B=layout data of $N^+$ polysilicon resist devices within N well regions.

(3) Generating D, where D=$P^+$ implanted defined polysilicon layout data.

(4) Generating E, where E=layout data of P polysilicon resist devices within N well regions.

(5) Generating F, where F=layout data for $P^+$ polysilicon resist devices within P well regions.

(6) Generating an $N^+$ polysilicon implantation layout with B, F and the N well layout data.

The new $N^+$ polysilicon implantation layout generated by these steps is used to make an $N^+$ polysilicon implantation mask, which is in turn used in a photolithographic process to transfer a pattern to the resist layer on a polysilicon layer that is to undergo $N^+$ ion implantation.

More specifically, in the logical operations described above, A is generated from $N^+$ ion implantation layout and defined polysilicon layout data; B is generated from A ($N^+$ implanted defined polysilicon layout data), the SAB layout data, and the N well layout data; D is generated from the $P^+$ implantation layout data and the defined polysilicon layout data; E is generated from D ($P^+$ implanted defined polysilicon layout data) and the N well layout data; and F is generated from {D-E} and the SAB layout data. F is the layout data of $P^+$ polysilicon resist devices within the P well region layout data, where {D-E} is obtained by subtracting E from D.

Figure 3:
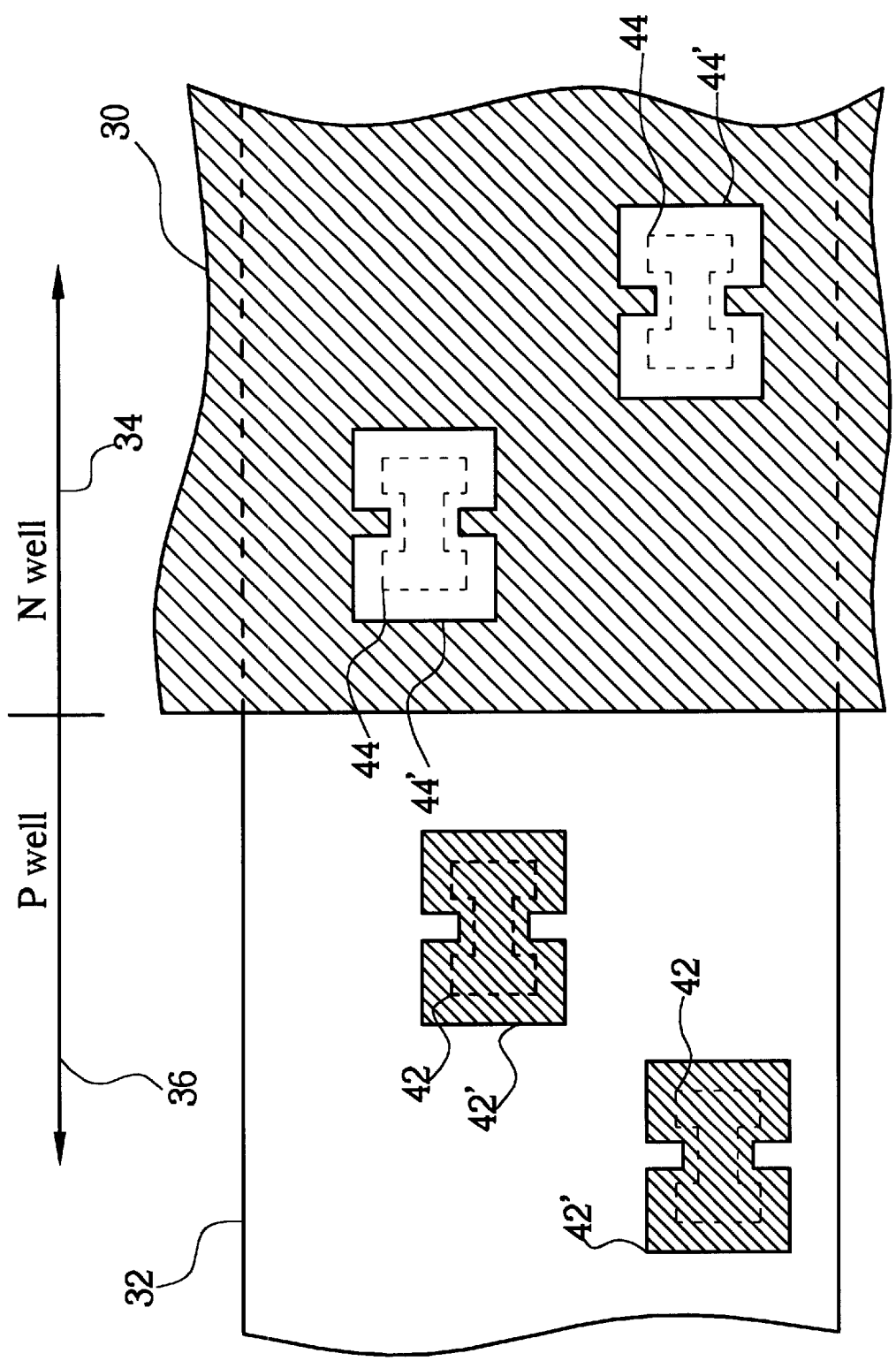
FIG. 3 is a view of the result of an adjustment on the photoresist layout in FIG. 2.

Please refer to FIG. 3. FIG. 3 is a view of the result of an adjustment on the photoresist layout pattern 30 in FIG. 2. After generating B and F, the manufacturer needs to obtain a predetermined shifting value to reduce the degree of misalignment in the photolithographic operation. The shifting value is between 0.3 and 0.5 micrometers. As shown in FIG. 3, after a shift by 0.4 microns, the region 42, which is the part of the polysilicon layer 32 covered with photoresist in the P well region 36, is expanded to a larger region 42'. And the region 44, the photoresist layer above which needs to be opened in the N well region 34, is expanded to a larger region 44' after the shift by 0.4 microns. In this way, the manufacturer reduces the possibility of misalignment during the ion implantation process.

The most important feature of the present invention is that it provides a method of making x 2.5 $N^+$ polysilicon implantation mask to satisfy the needs of clients whose circuit layout data goes astray from the following design rules, which are prerequisites for making $N^+$ polysilicon implantation masks according to the prior art method: (1) $N^+$ polysilicon resist devices must be located within P well regions; (2) $P^+$ polysilicon resist devices must be located within N well regions. More specifically, since in this method, the manufacturer utilizes circuit layout data and a logical operation to generate a new layout pattern, not only is the production yield generated from x 2.5 $N^+$ ion implantation mask retained, but the needs of clients, whose original circuit layout data do not meet the design rules, can also be satisfied.

Those skilled in the art will readily observe that numerous modifications and alterations of the method may be made while retaining the teachings of the invention. Accordingly, the above disclosure should be construed as limited only by the metes and bounds of the appended claims.

What is claimed is:

1. A method for manufacturing a mask, the method comprising:

providing an integrated circuit layout data base, the integrated circuit layout data base comprising $N^+$ ion implantation layout data, $P^+$ ion implantation layout data, defined polysilicon layout data, N well layout data, and salicide block (SAB) layout data;

reading in data from the integrated circuit layout data base and performing a logical operation using these read data, thereby generating a layout pattern including at least one set of the layout data of the $N^+$ polysilicon resist devices within an N well region and the $P^+$ polysilicon resist devices within a P well region; and forming the mask using the layout data of the $N^+$ polysilicon resist devices within the N well region, the $P^+$ polysilicon resist devices within the P well region and the N well layout data;

wherein the mask is used to transfer a layout pattern on the mask to a photoresist layer atop a polysilicon layer to be $N^+$ implanted during a photolithographic process.

2. The method of claim 1 wherein the mask is ax 2.5 $N^+$ polysilicon implantation mask.

3. The method of claim 1 wherein the polysilicon layer is to be implanted with phosphor ions.

4. The method of claim 1 wherein after generating the layout pattern of the $N^+$ polysilicon resist devices within the N well regions and the $P^+$ polysilicon resist devices within the P well regions, the layout pattern is shifted by a displacement to reduce misalignment of the photolithographic process.

5. The method of claim 4 wherein the displacement is between 0.3 and 0.5 micrometers.

6. The method of claim 1 wherein the result produced by the logical operation further comprises $N^+$ polysilicon implantation layout data.

7. The method of claim 6 wherein the $N^+$ polysilicon implantation layout data is generated using the N well layout data, the layout data of the $N^+$ polysilicon resist devices within the N well regions, and the $P^+$ polysilicon resist devices within the P well regions.

8. A method for manufacturing an implantation mask, the method comprising:

provinding an integrated circuit data base, the integrated circuit data base comprising $N^+$ ion implantation layout data, $P^+$ ion implantation layout data, defined polysilicon layout data, N well region layout data, and salicide block (SAB) layout data;

reading in data from the integrated circuit layout data base and performing a logical operation using a computer system, the logical operation comprising:

generating A, where A=$N^+$ implanted defined polysilicon layout data;

generating B, where B=$N^+$ polysilicon resist devices within the N well region layout data;

generating D, where D=$P^+$ implanted defined polysilicon layout data;

generating E, where E=$P^+$ polysilicon resist devices within the N well region layout data; and generating F, where F=$P^+$ polysilicon resist devices within a P well region layout data;

producing an $N^+$ polysilicon implantation layout data using the B, the F and the N well region layout data; and forming the implantation mask using the $N^+$ polysilicon implantation layout data;

wherein the implantation mask is used to transfer a layout pattern on the implantation mask to a photoresist layer atop a polysilicon layer to be $N^+$ implanted during a photolithographic process.

9. The method of claim 8 wherein the implantation mask is a x 2.5 $N^+$ polysilicon implantation mask.

10. The method of claim 8 wherein the polysilicon layer is to be implanted with phosphor ions.

11. The method of claim 8 wherein after generating B and F, the layout pattern is shifted by a displacement to reduce misalignment of the photolithographic process.

12. The method of claim 11 wherein the displacement is between 0.3 and 0.5 micrometers.

13. The method of claim 8 wherein A=($N^+$ ion implantation layout data) AND (defined polysilicon layout data).

14. The method of claim 8 wherein B=(A) AND (SAB layout data) AND (N well layout data).

15. The method of claim 8 wherein D=($P^+$ ion implantation layout data) AND (defined polysilicon layout data).

16. The method of claim 8 wherein E=(D) AND (N well layout data).

17. The method of claim 8 wherein F=(D) NOT (E) AND (SAB layout data).

18. The method of claim 8 wherein the photoresist layer is composed of a positive type photoresist.

19. The method of claim 8 wherein the computer system is a computer aided design (CAD) system.

* * * * *